United States Patent
Holt et al.

(10) Patent No.: US 11,138,024 B2
(45) Date of Patent: Oct. 5, 2021

(54) MULTIPLE INDEPENDENT LIFECYCLE STATES

(71) Applicant: Apple Inc., Cupertino, CA (US)

(72) Inventors: Stephen F. Holt, San Francisco, CA (US); Gordon J. Freedman, San Jose, CA (US); Shubham Kedia, Cupertino, CA (US); Stephen C. Moseley, San Jose, CA (US); Cindy M. Barrett, Menlo Park, CA (US); Patrick Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/858,883

(22) Filed: Apr. 27, 2020

(65) Prior Publication Data

US 2020/0356388 A1 Nov. 12, 2020

Related U.S. Application Data

(60) Provisional application No. 62/855,685, filed on May 31, 2019, provisional application No. 62/844,020, filed on May 6, 2019.

(51) Int. Cl.
*G06F 9/451* (2018.01)
*G06F 21/32* (2013.01)
*G06F 9/48* (2006.01)
*G06F 9/54* (2006.01)

(52) U.S. Cl.
CPC .............. *G06F 9/451* (2018.02); *G06F 9/485* (2013.01); *G06F 9/542* (2013.01); *G06F 21/32* (2013.01)

(58) Field of Classification Search
CPC .......... G06F 9/451; G06F 9/542; G06F 9/485; G06F 21/32
See application file for complete search history.

(56) References Cited

U.S. PATENT DOCUMENTS

| | | | | |
|---|---|---|---|---|
| 5,694,561 A * | 12/1997 | Malamud | ............. | G06F 3/0481 715/805 |
| 7,827,358 B2 | 11/2010 | Watson et al. | | |
| 2008/0005693 A1* | 1/2008 | Oliver | ................. | G06F 3/04845 715/781 |
| 2013/0061027 A1* | 3/2013 | Chen | ..................... | G06F 9/3851 712/234 |
| 2017/0097973 A1* | 4/2017 | Iannaccone | ......... | H04L 67/1095 |

* cited by examiner

*Primary Examiner* — Roberto Borja
(74) *Attorney, Agent, or Firm* — Womble Bond Dickinson (US) LLP

(57) ABSTRACT

Methods and systems are disclosed that create user interface (UI) instances for corresponding input/output resources, such as display resources, and each of these UI instances have separate lifecycle states or information maintained by the respective UI instances. System processes for the display resources (e.g. different displays or different windows for the same display devices) can control access to their respective display resource and can report changes in the lifecycle states to their respective UI interface.

18 Claims, 6 Drawing Sheets

MULTIPLE INDEPENDENT LIFECYCLE STATES

This application claims the benefit of U.S. Provisional Patent Application No. 62/855,685 filed May 31, 2019, and U.S. Provisional Patent Application No. 62/844,020 filed May 6, 2019, which are incorporated herein by reference.

BACKGROUND

This disclosure relates to management of system resources of a data processing system such as display resources, memory (e.g. DRAM) resources, and processor(s) resources (e.g. CPU, GPU, DSP etc.)

Modern data processing systems often use management of the lifecycle of one or more applications (e.g. a computer program such as a web browser or media player or navigation and map application, etc.) to control how those applications use system resources. Applications can be launched, become active, be used in the foreground (e.g. displayed as a top most window and receive user inputs and provide displayed outputs), then become idle, and then go to the background (e.g. off screen or behind other windows); the user may never explicitly quit or terminate the application so that the application may linger and still use system resources even though it is no longer being used and may not be used again for a long period of time (e.g., days or weeks). One example of lifecycle management is Jetsam used in Apple's iOS on iPhones and iPads. Jetsam attempts to monitor the lifecycle state of applications and daemons and reclaim used memory by terminating idle background applications. U.S. Pat. No. 7,827,358 describes an example of Jetsam.

SUMMARY OF THE DESCRIPTION

Systems and methods can create user interface (UI) instances for corresponding system resources, such as display resources, and each of the UI instances can have separate, independently managed, lifecycle states or information maintained by the respective UI instance.

In one embodiment, a method that uses such UI instances can include the following operations: creating, by or at the request of an application after the application is launched on a data processing system, a first user interface instance that includes a first management object that maintains a first lifecycle state or information for a first UI of the application that can be output to a first display resource; and creating, by or at the request of the application, a second UI instance that includes a second management object that maintains a second lifecycle state or information for a second UI of the application that can be output to a second display resource. The first UI can be referred to as a first scene. The output of the first UI can be provided through a first system process that controls and manages access to the first display resource, and the output of the second UI can be provided through a second system process that controls and manages access to the second display resource. The second UI can be referred to as a second scene. In one embodiment, the application maintains an overall application lifecycle state or information that is separate from the first lifecycle state or information and is separate from the second lifecycle state or information. The overall application lifecycle state or information can be based on, for example, the maximum of the first and the second lifecycle states (and any other lifecycle states of other UI instances of the application); for example, if the first lifecycle state for the first UI is background active and the second lifecycle state is foreground idle (and there are no other UI instances with lifecycle states) then the overall application lifecycle is foreground idle. Each of the lifecycle states for each of the UI instances can be independent of each other and be managed independently of each other. In one embodiment, each lifecycle state or information can be any one of: foreground active; foreground inactive; background active; and background inactive, where foreground active is the maximum lifecycle state and background inactive is the minimum lifecycle state in this example.

In one embodiment, the first system process can provide data (e.g., through an Application Programming Interface (API)) indicating a change in the lifecycle state or information for the first UI to the first UI instance to allow the first UI instance to update the first lifecycle state or information and to allow the application to update, if appropriate given the other lifecycle states of the other UI instances, the overall application lifecycle state or information. In response to this change (e.g. from foreground active to background inactive), the application can reduce system resource usage by, for example, reducing usage of DRAM by deallocating memory, etc. Moreover, in response to this change, the first system process can restrict or prevent access to system resources such as the first display resource.

In one embodiment, the first display resource is a first display device that is an integrated part of the data processing system (e.g. the built in touchscreen of a smartphone), and the second display resource is a second display device that is external to and separable from the data processing system (e.g., a display in a car or a TV). In another embodiment, the first display resource is a first window displayed on a first display device, and the second display resource is a second window displayed on the first display device, and the first lifecycle state or information is for the first UI displayed in the first window and the second lifecycle state or information is for the second UI displayed in the second window; in this another embodiment, the application provides output for multiple windows that can be displayed concurrently.

In one embodiment, the first system process includes a first interface (e.g. a first role) to communicate data (e.g., through an API) to the first UI instance to allow the first UI instance to maintain (e.g., update based on changes) the first lifecycle state or information, and the second system process includes a second interface (e.g. a second role) to communicate data (e.g. through the API) to the second UI instance to allow the second UI interface to maintain (e.g. update based on changes) the second life cycle state or information.

In one embodiment, the first system process includes a first interface (e.g., a first role) and a second interface (e.g. a second role) that communicate (e.g., through an API) with the application. The first interface can communicate with the application to display the first UI when the data processing system is unlocked, and the second interface can communicate (e.g. through the API) with the application to display content from the application when the data processing system is locked. When the data processing system is locked, a user input in the form of a code or password or biometric recognition or authentication from a user is required to unlock the data processing system. A locked data processing system normally cannot be used beyond certain limited activities (e.g. making an emergency phone call).

The aspects and embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in nonvolatile memory such as flash memory or dynamic random access memory or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments and aspects.

Reference in the specification to "one aspect", "one embodiment" or "an embodiment" or "an aspect" means that a particular feature, structure, or characteristic described in conjunction with the aspect or embodiment can be included in at least one aspect or embodiment. The appearances of the phrase "in one embodiment" or "in one aspect" in various places in the specification do not necessarily all refer to the same embodiment or aspect. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
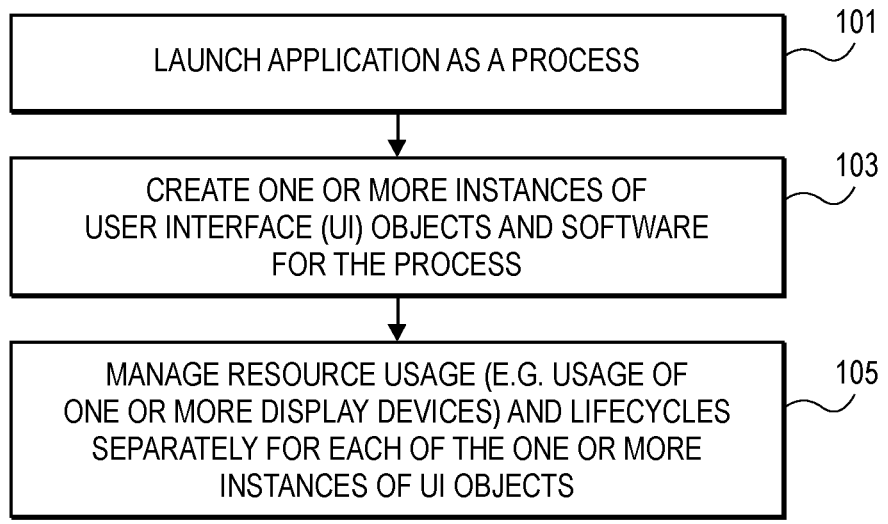
FIG. 1 (FIG. 1) shows an example of a method according to one embodiment.
Figure 2:
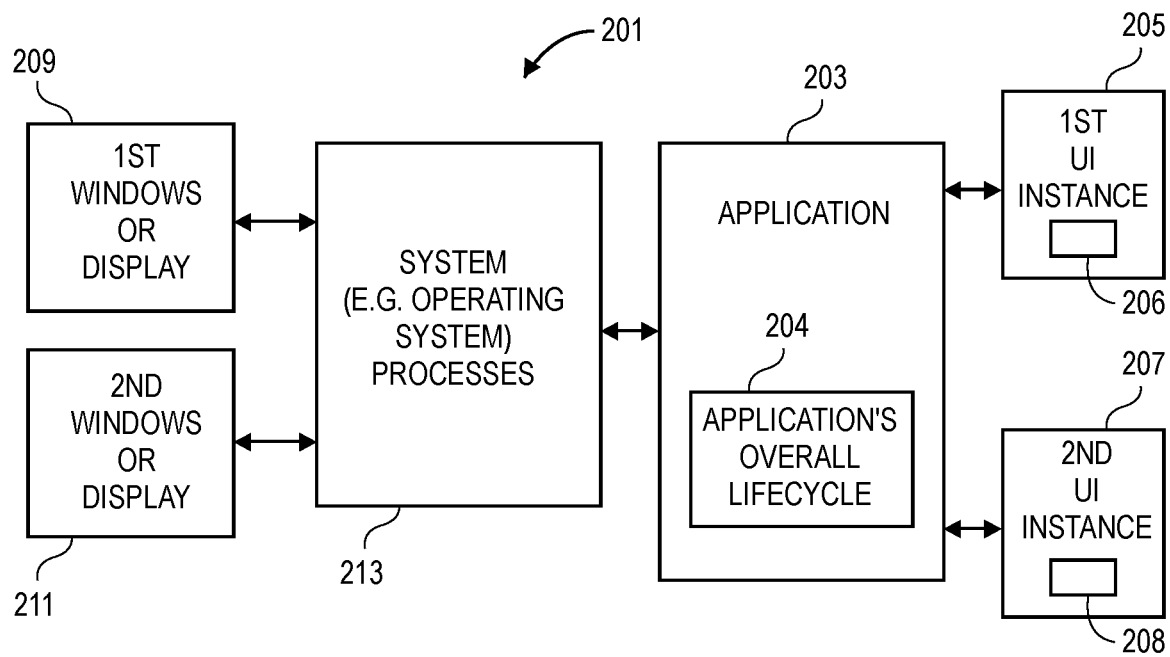
FIG. 2 (FIG. 2) shows a system according to one embodiment.

The systems and methods described herein can create multiple user interface (UI) instances (e.g., as software objects) for corresponding system resources, such as display resources, audio resources, haptic input or output resources, and other system resources, and each of these UI instances can have separate, independently managed, lifecycle states or information maintained by the respective UI instance for each separate UI (e.g. separate scenes). FIG. 1 shows an example of one such method. Referring now to FIG. 1, in operation 101 a data processing system can launch an application as a single process. The data processing system can be a smartphone (e.g. iPhone) or tablet computer (e.g. an iPad) or a laptop computer or a wearable device or other electronic device or consumer electronic product, and the application can be a user application such as a media player (e.g. to play TV shows or movies) or a map application or a messaging application or a web browser, etc. The data processing system can include one or more processors coupled to both volatile (e.g. DRAM) and non-volatile memory (e.g. Flash memory) through one or more buses that also couple the one or more processors to one or more display devices and input devices such as a touchscreen, etc. The system's memory and display devices and the one or more processors are part of the system's resources. The application can in operation 103, after being launched, create or cause the creation of one or more UI instances that can include software objects that maintain lifecycle state or information for one or more UIs (e.g. one or more scenes). These UI instances can then, in operation 105, be used to maintain the lifecycle states for the one or more UIs (e.g., one or more scenes) and be used to help manage system resources, such as display resources, for the data processing system. A lifecycle associated with and maintained by one UI instance can be separately maintained relative to the other lifecycle(s) maintained by other UI instances. FIG. 2 shows an example of a data processing system that can use the method shown in FIG. 1 (or the methods shown in FIG. 4 or 5).

Referring now to FIG. 2, a data processing system 201 can include an application 203 that has participated in the creation of a UI instance 205 and a UI instance 207. The application 203 operates with system processes 213 that can include an operating system, such as iOS from Apple, Inc. of Cupertino, Calif. The system processes 213 can manage and control the use of system resources such as display resources 209 and 211 (e.g. first window or display device and second window or display device) and other input/output resources (such as audio input resources or audio output resources or haptic input resources or haptic output resources) and memory resources (e.g. DRAM in main memory) and processing resources (such as one or more CPUs or GPUs, etc.). In one embodiment, the system processes own these resources such that one or more applications, such as application 203, must request access to these resources and can obtain such access only if access is granted by the system processes. Moreover, the system processes 213 can terminate access or deny access. Thus, the display resources (such as display resources 209 and 211) are controlled and managed by system processes 213 which can grant access to the application 203 to allow the application to display content on the one or more display resources and to receive inputs from the display resources (in the case of a touchscreen display). The application 203 can create or cause the creation of a first UI that is displayed on the display resource 209, and the lifecycle state (or information) 206 for that first UI is maintained by the UI instance 205. The application 203 can also create or cause the creation of a second UI that is displayed on the display resource 211, and the lifecycle state (or information) 208 for that second UI is maintained by the UI instance 207. In one embodiment, the UI instance 205 and the UI instance 207 separately and independently maintain their respective lifecycle states 206 and 208 (for their respective UIs on display resources 209 and 211) based upon communications (e.g. through one or more APIs) with the system processes 213.

In addition, the application 203 also maintains an overall application lifecycle state 204 that is separate from but based upon the lifecycle states of all of the UI instances (that maintain lifecycle states for associated UIs) created by the application 203 such as UI instances 205 and 207. In one embodiment, the overall application lifecycle state 204 can be the maximum lifecycle state of the set of lifecycle states maintained by all of the UI instances (that maintain lifecycle states for associated UIs provided by the application 203). Thus, if there are three such UI instances (for three corresponding UIs or scenes) and their respective lifecycle states are foreground active (for a first scene), foreground inactive (for a second scene) and background inactive (for a third scene), then the overall application lifecycle state is foreground active. If all three lifecycle states are background inactive, then the overall application lifecycle state 204 is background inactive, and in this state the system processes 213 may have prevented access to the display resources and the application 203 can be subject to memory reduction requests (e.g. from Jetsam Processes), and the application may reduce memory (e.g. DRAM) usage by known techniques including deleting caches, data structures that can be recreated, etc. In one embodiment, the display resource 209 can be a first window (displaying a first UI from application 203) on an integrated display device on the data processing system and the display resource 211 can be a second window (displaying a second UI from application 203) on the same integrated display device. Each window includes a border that defines the extent of the window, and each window may be separately manipulated relative to the other window (e.g. it may be moved or closed or resized, etc.). In another embodiment, the display resource 209 can be the integrated display device that is an inseparable part of the data processing system, and the display resource 211 can be an external display device (e.g., a car's built-in display) that is coupled to but separable from the data processing system. In this case, a change in the status of the display resource 211 can be detected by system processes 213 (e.g. the user unplugs the data processing system from the car) and this can cause the system processes to prevent access by application 203 to display resource 211 and to report the change to the corresponding UI instances which can then update the corresponding lifecycle state.

An example of the operation of the system 201 shown in FIG. 2 will now be provided. The application 203 can be a media player application or a map application. The application can be executing on the data processing system 201 along with the system processes 213. The application 203 can obtain access to the display resource 209 and the display resource 211 through the system processes 213 as described herein. The application 203 can create the first UI instance 205 and also create the UI instance 207. The display resource 209 can be the integrated touchscreen display of a smart phone and the display resource 211 can be the built-in display of a vehicle which is configured to support the display of information from another device such as a smartphone and the vehicle can also be configured to provide inputs to the another device; for example, the vehicle's display may include a touchscreen that displays outputs from the smartphone and also receives inputs to control the smartphone. The display resource 211 can be, for example, a vehicle that is configured to support Android Auto from Google or is configured to support CarPlay from Apple Inc. of Cupertino Calif. The first user interface which is displayed on the display resource 209 can be the user interface normally displayed on the data processing system, and the second user interface displayed on the display resource 211 can be the user interface displayed on the vehicle's display device when the vehicle has enabled this feature (e.g., Android Auto or CarPlay, etc.). In this example, the vehicle's display is an external display that is coupled to the data processing system (e.g. a smartphone). The UI instance 205 can maintain the lifecycle state for the first user interface displayed on the display resource 209, and the user interface instance 207 can maintain the lifecycle state for the second user interface displayed on the display resource 211. While both user interfaces are being displayed, the lifecycle state 206 and the lifecycle state 208 can be foreground active while the user interacts with one or both portions of the user interface. For example the user may touch the smart phone and may also interact with the vehicle's display causing both lifecycle states to be in the foreground active states. Then the user may unplug the smart phone from the car thereby disconnecting the smart phone from the display resource 211. In response, the system processes 213 detect this disconnection and can prevent further access by the application 203 to the display resource 211. Furthermore, the system processes 213 can report the disconnection to the user interface instance 207 which can then update lifecycle state 208 to indicate that the lifecycle state should now be at background idle or some other appropriate lifecycle state that the data processing system 201 can support. In response to the change of the lifecycle state 208, the application 203 may update the application's overall lifecycle state 204 if lifecycle state 206 is also changed. If the user continues to use the media player or map application on the data processing system 201 then the lifecycle state 206 may not have changed and the application 203 may still be in the foreground active state. On the other hand, if the application 203 has moved to the background because the user has selected another application for use in the foreground, then the lifecycle state 206 may be changed to, for example, background inactive or background active causing the application 203 to update the application's overall lifecycle 204 to the maximum of the lifecycle states for any user interface instance of the application that maintains a lifecycle state.

Figure 3:
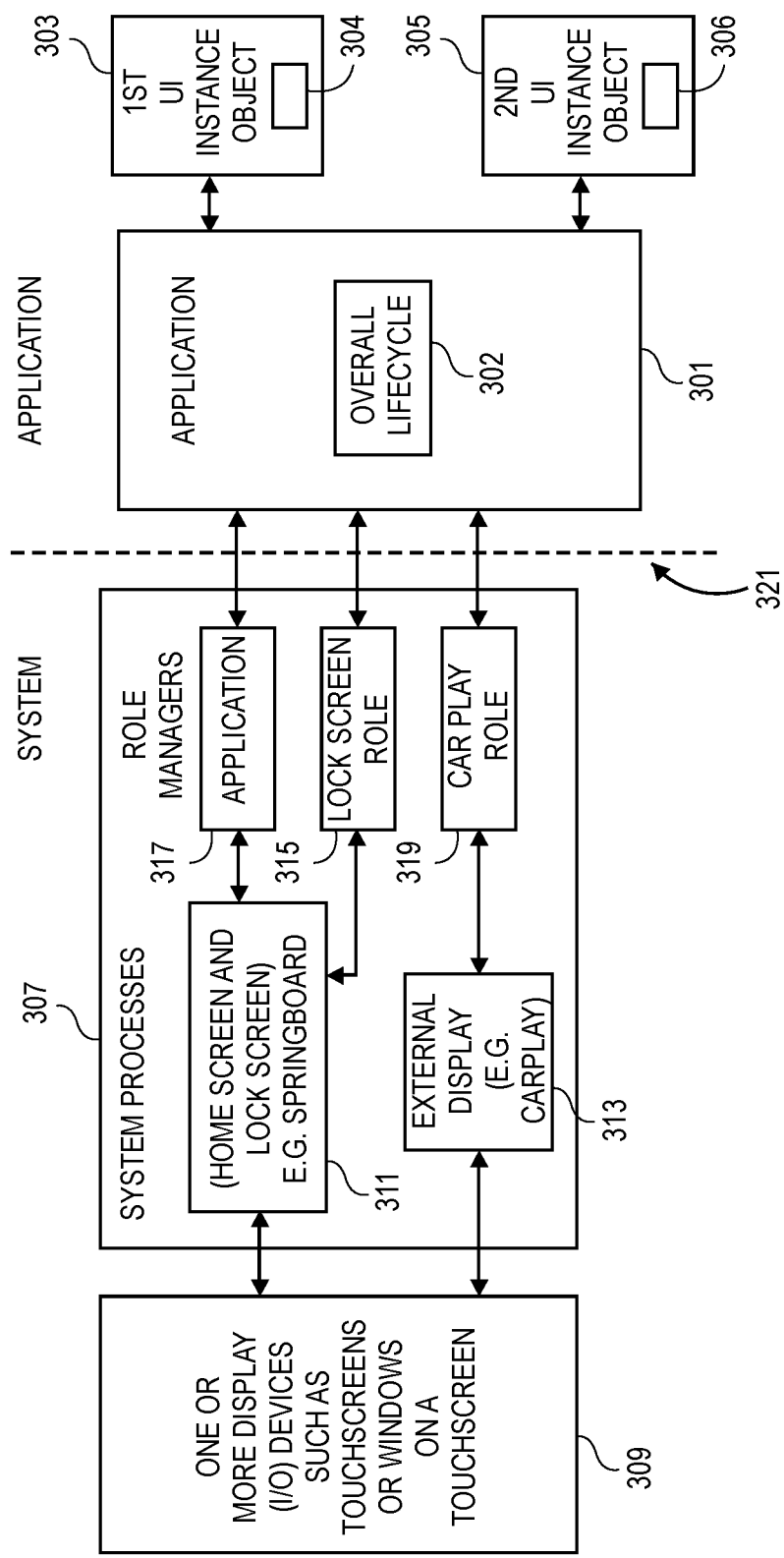
FIG. 3 (FIG. 3) shows an example of a system according to an embodiment.

FIG. 3 shows an example of a system which is similar to the system 201 except that further details with respect to the system processes are shown in FIG. 3. The application 301 corresponds to application 203 in FIG. 2. User interface instance 303 corresponds to user interface instance 205 shown in FIG. 2. Similarly, user interface instance 305 corresponds to user interface instance 207 shown in FIG. 2. The one or more display devices 309 correspond to display resources 209 and 211 shown in FIG. 2. The application 301 is shown with two user interface instances that maintain lifecycle states for corresponding user interfaces but it will be understood that there can be more than two or fewer than two. The application 301 also maintains an overall lifecycle state 302 which is based upon the lifecycle states 304 and 306 maintained respectively by user interface instance 303 and user interface instance 305. The system processes 307 execute on what can be considered the system portion of the data processing system while the application 301 executes on the application portion of the data processing system. Vertical line 321 illustrates this demarcation between the system portion and the application portion. It will be appreciated that the data processing system can have a plurality of applications which include application 301, and the plurality of applications can be executing concurrently along with the system processes 307. Each of these other applications can use the one or more embodiments described herein. The system processes 307 can include processes that manage and control display resources, such as process 311 and an external display process such as an external display process 313 (which in one embodiment can support Android Auto or CarPlay). The process 311 can be used to provide output for the user interface of an application when the data processing system has been unlocked and can also be used to provide for the display of content from the application when the data processing system is locked such as when a lock screen is displayed on the display device and the data processing system has been locked, thereby requiring a user input to unlock the data processing system. In one embodiment, the process 311 can be a system shell that provides an interface for the application for interactions (e.g. inputs and outputs) with the operating system of the data processing system. In one embodiment, process 311 is a process that, for example, displays an application launch interface (such as the one or more home screens of Springboard on iOS from Apple Inc.) which a user can use to browse installed (or installable) applications and cause them to be launched by selecting one of the displayed applications (e.g. touching an icon representing the application). In one embodiment, process 311 can also display notifications and a lock screen and allow a user to interact with notifications (e.g. a text message) and to enter user credentials into or through the lock screen to authenticate the user to the data processing system. Springboard, on iOS from Apple Inc. is an example of process 311.

Different role managers are also shown as part of system processes 307, and these different role managers act as interfaces between the system process associated with the role manager and the application and user interface instance for the user interface that is being displayed (or otherwise processed depending on the input, output or both) through the corresponding system process. For example, the application role manager 317 interacts with the application 301 and user interface instance 303 to display the user interface of the application when the data processing system has been unlocked. When the data processing system becomes locked, content from the application can be provided through the role manager 315 which communicates with the system process 311 to display that content (e.g. a notification or a map or audio metadata or other content) on the lock screen, and that content may have a lifecycle state maintained by the user interface instance 305 in this example. The system process 311 also includes a role manager 319 which acts as a communication interface between the external display process 313 and the corresponding user interface instance which may be user interface instance 305 or another user interface instance not shown in FIG. 3. The application 301 can interface through one or more role managers which in turn communicates with one or more system processes.

Figure 4:
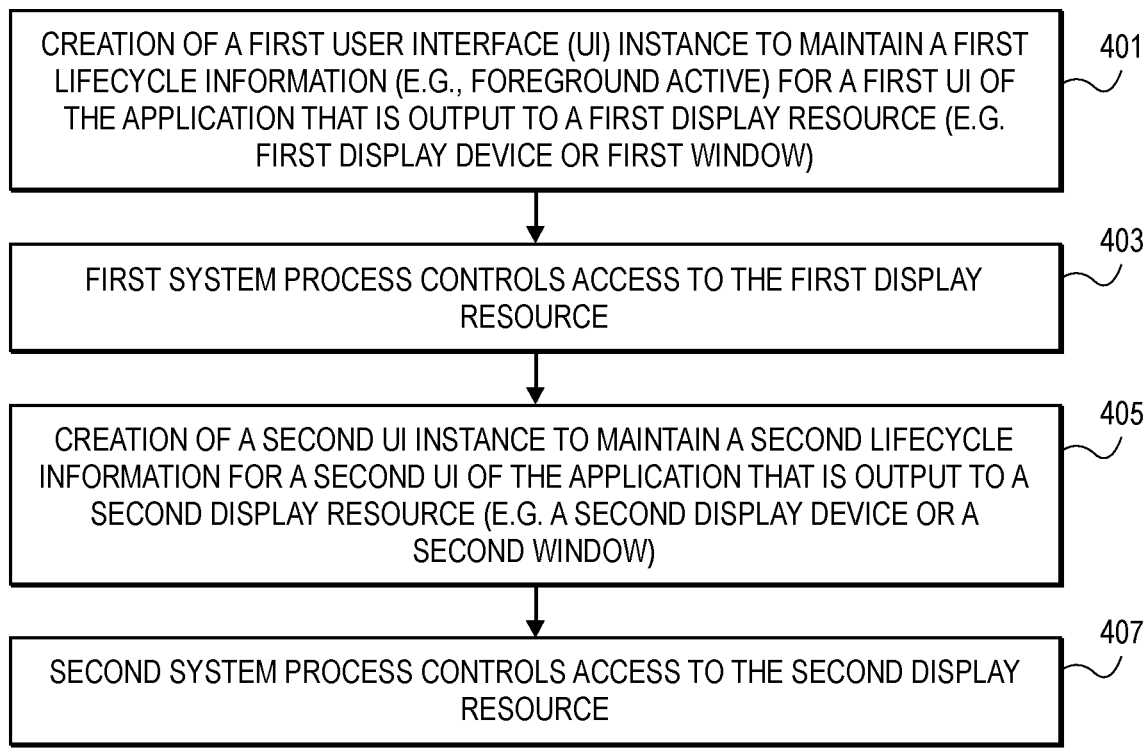
FIG. 4 (FIG. 4) is a flowchart that shows a method according to an embodiment.

An example of the operation of the system shown in FIG. 3 will now be provided in conjunction with the method shown in FIG. 4. In operation 401 of FIG. 4, the application, such as application 301, creates or causes the creation of a first user interface instance, such as user interface instance 303, to maintain a first lifecycle state for a first user interface of the application that is output to a first display resource (or uses another system resource). In operation 403, a first system process controls access to the first display resource (or controls access to another system resource), which can be the one or more display resources 309 shown in FIG. 3. In operation 405, the application creates or causes the creation of a second user interface instance to maintain a second lifecycle information for a second user interface of the application that is output to a second display resource (or to another system resource). In operation 407, the second system process controls access to the second display resource (or controls access to another system resource). Referring back to FIG. 3, the application 301 can, in one embodiment, create the user interface instance 305 which communicates with a second system process, such as the system process 313 shown in FIG. 3.

Figure 6:
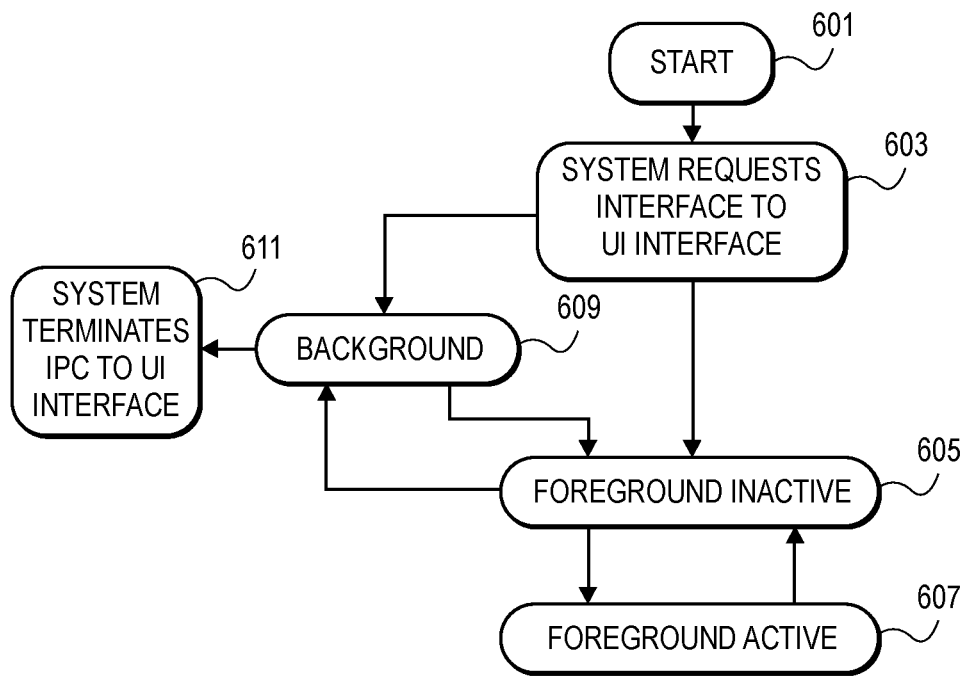
FIG. 6 (FIG. 6) is a state diagram that shows an example of transitions between lifecycle states according to one embodiment.

The system processes 307 can report changes in lifecycle states of the different portions of the user interface, such as the first user interface and the second user interface for the application 301. There can be a plurality of different state transitions as shown in FIG. 6. Typically, the starting state 601 begins in response to launching the application, and at some point the system requests, in state 603, an interface to a user interface object, such as the user interface instance 303. From state 603, the lifecycle can transition to either a background state 609 or a foreground inactive state 605. The background state 609 can transition to a foreground inactive state 605 which in turn can transition to a foreground active state 607 as shown in FIG. 6. The changes in lifecycle state can be reported by the system processes back to the application and back to the corresponding user interface instance in order to update the lifecycle state of the particular user interface which has been changed and the system can terminate interprocess communication to the UI interface in state 611. In turn, the application can manage resource usage by reducing memory usage, for example, and the system processes can perform memory reduction operations, such as those associated with Jetsam as is known in the art or perform other system level management of system resources (e.g. throttling of CPU, or audio processors or haptic processors etc.).

Figure 5:
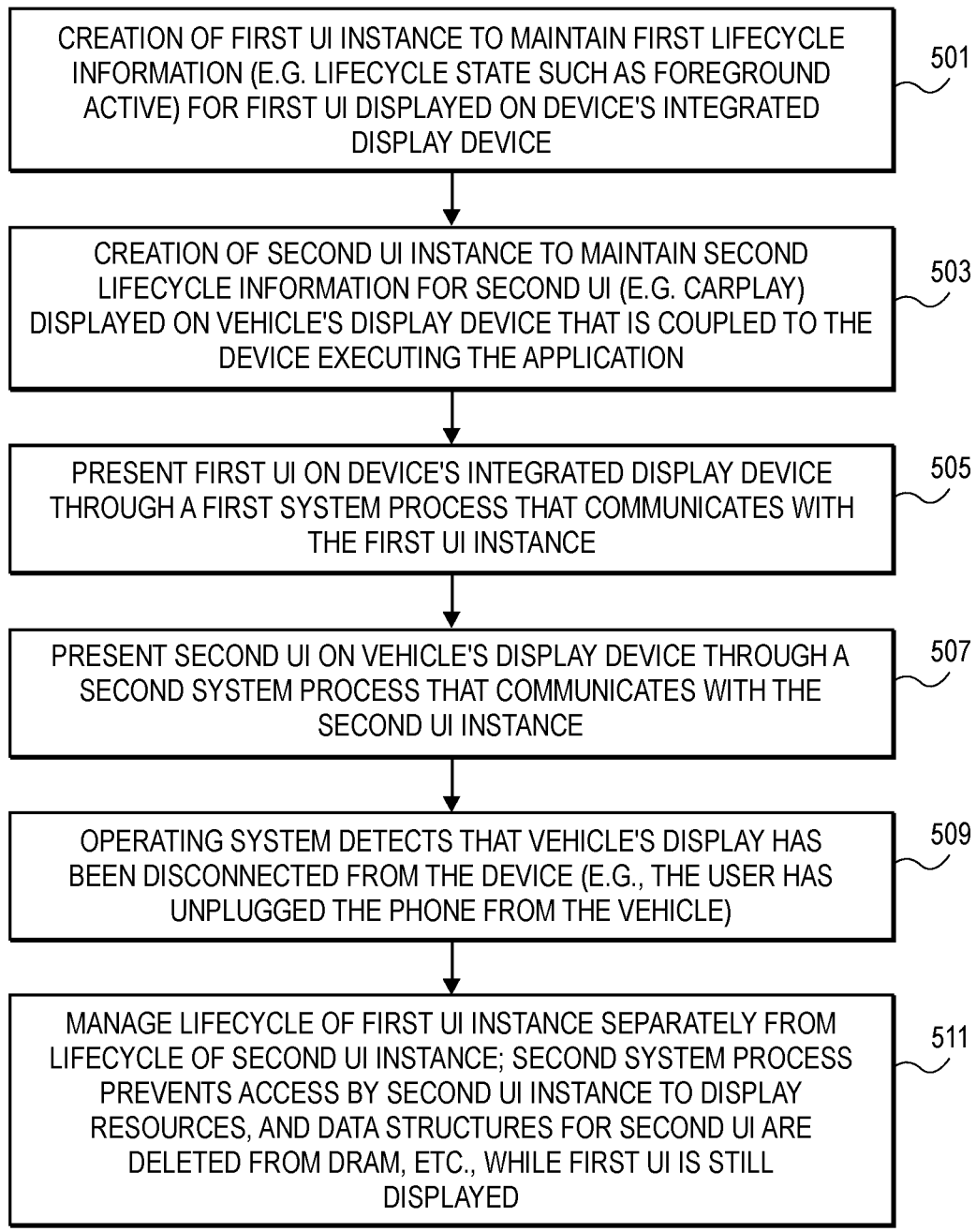
FIG. 5 (FIG. 5) is a flowchart that shows a method according to an embodiment.

FIG. 5 shows a flowchart which illustrates a particular example which can use the system shown in FIG. 3. In this example, it is assumed that the first display resource is an internal or integrated display of the data processing system and the second display resource is a vehicle's integrated display which is separable from the data processing system. In operation 501, the application creates a first user interface instance to maintain first lifecycle information for a first user interface displayed on the device's integrated display device. In operation 503, the application creates a second user interface instance to maintain second lifecycle information for a second user interface such as a user interface on an external display, that is displayed on the vehicle's display device that is coupled to the device that is executing the application. In operation 505, the data processing system presents the first user interface on the device's integrated display device through a first system process that communicates with the first user interface instance. In operation 507, the data processing system causes the display of the second user interface on the vehicle's display device through a second system process that communicates with the second user interface instance. For example, referring to FIG. 3, the user interface instance 303 can be the user interface instance that maintains the lifecycle state for the first user interface of the method shown in FIG. 5. The user interface instance 305 can be the instance which maintains the second lifecycle state for the second user interface shown on the vehicle's display. Then in operation 509, the operating system which is part of the system processes 307 detects that the vehicle's display has been disconnected from the data processing system. For example, the user may have unplugged the phone from the vehicle or otherwise disconnected the phone from the vehicle. In response, the system processes 307 can report the change to the second user interface instance through the appropriate role manager, such as the role manager 319 shown in FIG. 3. As a result, management of the lifecycle can be performed separately for the different user interfaces. This is shown as operation 511 in FIG. 5. In particular, the lifecycle of the first user interface instance can be used separately to manage the user interface associated with the first user interface instance. The change in the lifecycle state of the second user interface can cause the application to reduce memory consumption by deleting data structures, caches, and other objects associated with the second user interface while maintaining the data structures and other information associated with the first user interface if it is still displayed or otherwise used. The overall lifecycle of the application can be unchanged if the first user interface's lifecycle state remains unchanged.

In one embodiment, the data structures of a user interface can continue to exist even after a system resource (e.g. a display device or audio output device or haptic device or a combination of such devices) has been disconnected from the application that created the user interface; this can allow the application, should the connection to the system resource be re-established, to cause the presentation of the user interface using the saved data structures. In one embodiment, re-establishing the connection can cause the previously disconnected scene to be presented again through the re-established connection.

Figure 7A:
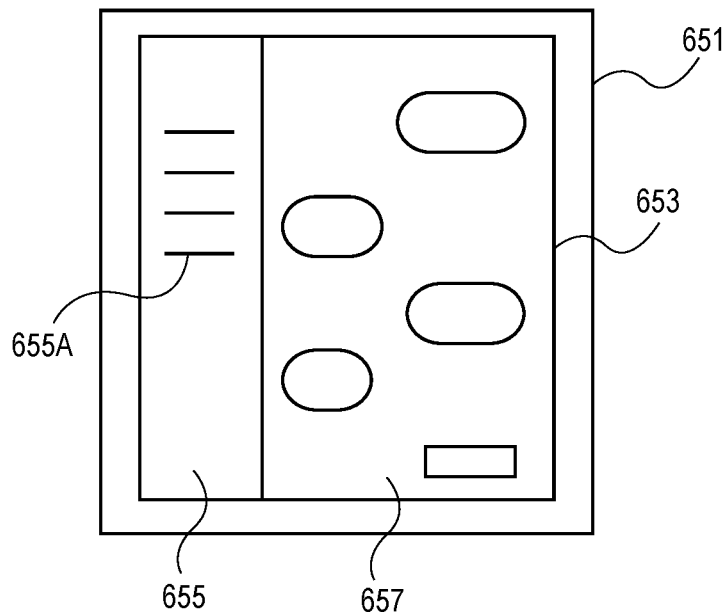
FIG. 7A (FIG. 7A) is an example of a displayed user interface that can be used with one embodiment described herein.
Figure 7B:
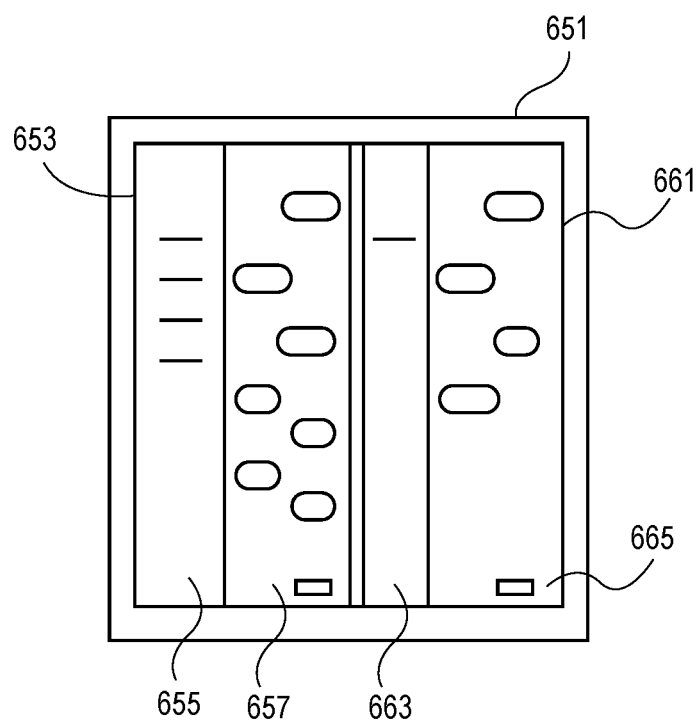
FIG. 7B (FIG. 7B) is an example of a displayed user interface that can also be used with one embodiment.

In one embodiment, the additional scenes or user interfaces can be created as a result of a user input that causes an application to switch from a single window mode (in which all content of the application is displayed in only a single window when the application is the foreground application) to a multiple window mode. This switch causes the creation of additional user interface instances to manage the lifecycle of each of the user interfaces in each of the windows provided by the application. The user input that causes the switch could be a command that indicates the user wants to create a separate window for certain selected content; this command may include a drag and drop user interface input or a selection of a command from a pop-up menu or other menu structure that can be displayed. For example, a user may be using an email application having only a single window or a messages application having only a single window and may desire to create a separate window for one of the conversations in one of these applications. The user can create a separate window for one of the conversations by, for example, selecting the conversation and dragging it out of the single window to create a new window to display only that conversation. FIGS. 7A and 7B show an example of this creation of a separate window. The user input that causes the creation of the separate window (separate scene) also causes the creation of a separate user interface instance that includes metadata (e.g. the lifecycle state) for this separate scene. In the example shown in FIG. 7A, the display 651 shows a window 653 for a messaging application. The window 653 is, at this point in time, the only window existing for the messaging application and it shows a conversation panel 655 that displays each of the various conversations between the user and other users. The transcript panel 657 shows a transcript of a conversation that was selected from the conversation panel 655; any one of the conversations in the conversation panel 655 can be selected to cause the display of the conversation in the selected conversation in the transcript panel 657. The user in one embodiment can select one of the conversations (e.g. conversation 655A) in the conversation panel and drag it out of the window 653. This user input in one embodiment causes the creation of a second window for the messaging application, and this second window is displayed, as shown in FIG. 7B as window 661 alongside window 653. The creation of window 661 causes the creation of a UI instance (e.g. UI instance 207) that manages the life cycle state of the UI shown in window 661, and this UI instance for window 661 is separate from a UI instance (e.g. UI instance 205) for window 653. Thus, each window has its own lifecycle state managed by its own UI instance; if window 653 is closed the messaging application will still remain executing if window 661 remains displayed (or is in the background). The window 661 includes transcript panel 665 that shows the transcript of the selected conversation, and the window 661 may also include a conversation panel 663 (which may show only the selected conversation in one embodiment).

Figure 8:
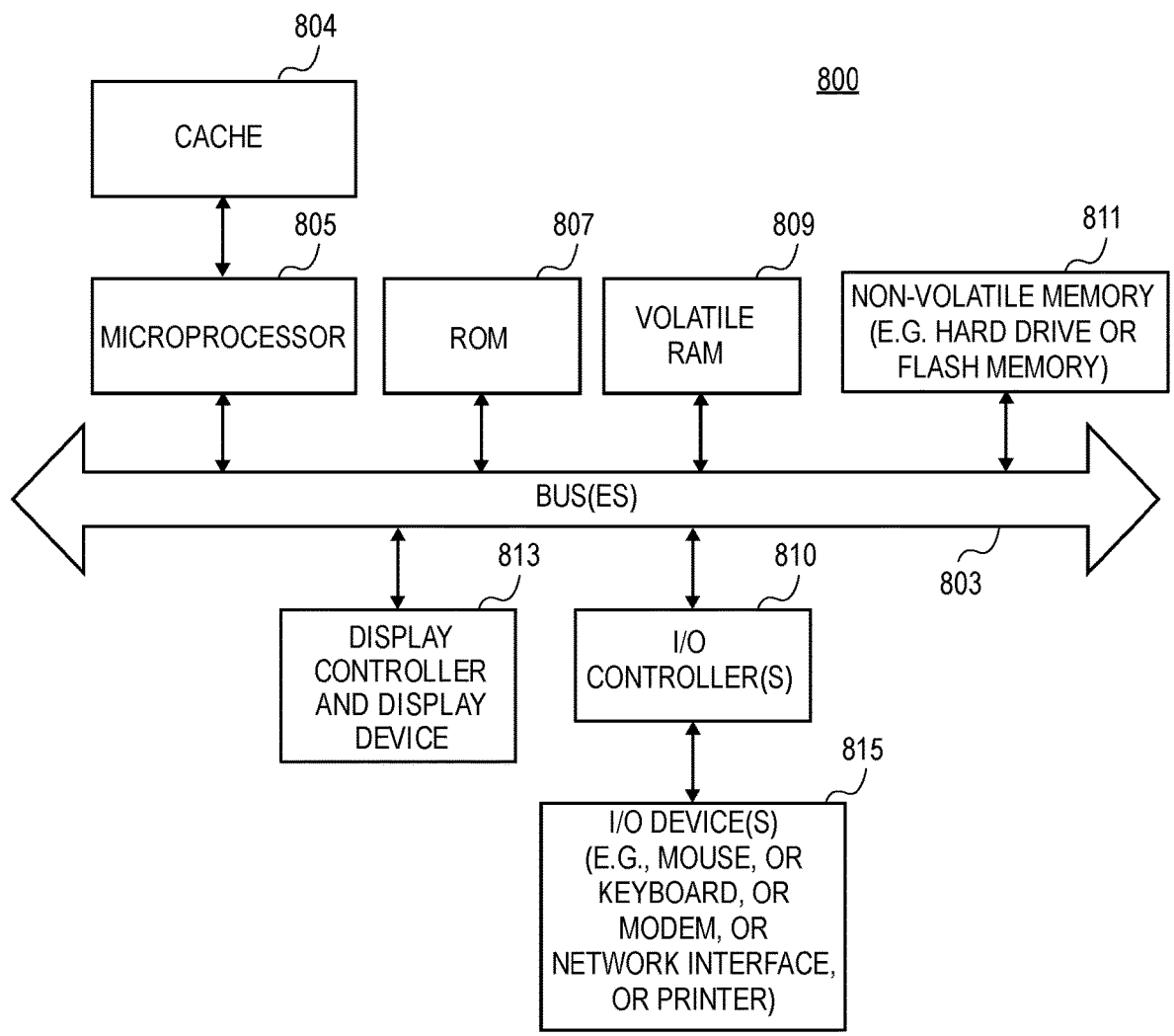
FIG. 8 (FIG. 8) is an example of a data processing system that may be used in one or more embodiments described herein.

FIG. 8 shows one example of a data processing system 800, which may be used with one embodiment. For example, the system 800 may be implemented to include a system 201 as shown in FIG. 1. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing program instructions which when executed by a data processing system cause the data processing system to perform a method comprising:

creating, by an application after the application is launched on the data processing system, a first user interface instance that includes a first management object to maintain a first lifecycle information for a first user interface (UI) of the application's UI that is output to a first display resource coupled to the data processing system, the output of the first UI provided through a first system process that controls access to the first display resource;

creating, by the application, a second user interface instance that includes a second management object to maintain a second lifecycle information for a second UI of the application's UI that is output to a second display resource coupled to the data processing system, the output of the second UI provided through a second system process that controls access to the second display resource;

wherein the first system process provides data indicating a change in a lifecycle information for the first UI to the first user interface instance;

the application updating application lifecycle information and the first lifecycle information based on the provided data indicating the change in lifecycle information; and the application modifying usage of system resources by the first user interface instance by reducing memory usage of the first user interface instance.

2. The non-transitory medium as in claim 1 wherein the application maintains the application lifecycle information that is separate from the first lifecycle information and the second lifecycle information and wherein the application lifecycle information is based on the first and the second lifecycle information.

3. The non-transitory medium as in claim 2 wherein the application lifecycle information is based on a highest lifecycle information in the set of the first and the second lifecycle information.

4. The non-transitory medium as in claim 3 wherein each of the first and the second lifecycle information is, independently relative to each other, one of: (1) foreground active; (2) foreground inactive; (3) background active and (4) background inactive and wherein foreground active is the highest lifecycle state.

5. The non-transitory medium as in claim 1 wherein the first system process prevents access to the first display resource in response to the change in the first lifecycle information for the first UI.

6. The non-transitory medium as in claim 5 wherein the first display resource is a first display device that is an integrated part of the data processing system and the second display resource is a second display device that is external to and separable from the data processing system.

7. The non-transitory medium as in claim 5 wherein the first display resource is a first window displayed on a first display device and the second display resource is a second window displayed on the first display device, and the first lifecycle information is for the first UI displayed in the first window and the second lifecycle information is for the second UI displayed in the second window.

8. The non-transitory medium as in claim 5 wherein the first system process includes a first interface to communicate data to the first user interface instance to maintain the first lifecycle information and the second system process includes a second interface to communicate data to the second user interface instance to maintain the second lifecycle information.

9. The non-transitory medium as in claim 5 wherein the first system process includes a first interface and a second interface that communicate with the application, the first interface communicates with the application to display the first user interface when the data processing system is unlocked and the second interface communicates with the application to display content from the application when the data processing system is locked, and wherein when the data processing system is locked a user input in the form of a code or password or biometric recognition from a user is required to unlock the data processing system.

10. A machine implemented method comprising:
creating, by an application after the application is launched on a data processing system, a first user interface instance that includes a first management object to maintain a first lifecycle information for a first user interface (UI) of the application's UI that is output to a first display resource coupled to the data processing system, the output of the first UI provided through a first system process that controls access to the first display resource;
creating, by the application, a second user interface instance that includes a second management object to maintain a second lifecycle information for a second UI of the application's UI that is output to a second display resource coupled to the data processing system, the output of the second UI provided through a second system process that controls access to the second display resource;
wherein the first system process provides data indicating a change in a lifecycle information for the first UI to the first user interface instance;
the application updating application lifecycle information and the first lifecycle information based on the provided data indicating the change in lifecycle information; and
the application modifying usage of system resources by the first user interface instance by reducing memory usage of the first user interface instance.

11. The method as in claim 10 wherein the application maintains the application lifecycle information that is separate from the first lifecycle information and the second lifecycle information and wherein the application lifecycle information is based on the first and the second lifecycle information.

12. The method as in claim 11 wherein the application lifecycle information is based on a highest lifecycle information in the set of the first and the second lifecycle information.

13. The method as in claim 12 wherein each of the first and the second lifecycle information is, independently relative to each other, one of: (1) foreground active; (2) foreground inactive; (3) background active and (4) background inactive and wherein foreground active is the highest lifecycle state.

14. The method as in claim 10 wherein the first system process prevents access to the first display resource in response to the change in the first lifecycle information for the first UI.

15. The method as in claim 14 wherein the first display resource is a first display device that is an integrated part of the data processing system and the second display resource is a second display device that is external to and separable from the data processing system.

16. The method as in claim 14 wherein the first display resource is a first window displayed on a first display device and the second display resource is a second window displayed on the first display device, and the first lifecycle information is for the first UI displayed in the first window and the second lifecycle information is for the second UI displayed in the second window.

17. The method as in claim 14 wherein the first system process includes a first interface to communicate data to the first user interface instance to maintain the first lifecycle information and the second system process includes a second interface to communicate data to the second user interface instance to maintain the second lifecycle information.

18. The method as in claim 16 wherein the first system process includes a first instance and a second interface that communicate with the application, the first interface communicates with the application to display the first user interface when the data processing system is unlocked and the second interface communicates with the application to display content from the application when the data processing system is locked, and wherein when the data processing system is locked a user input in the form of a code or password or biometric recognition from a user is required to unlock the data processing system.

* * * * *